（12）United States Patent
Roessl et al.

(10) Patent No.: US 9,423,514 B2
(45) Date of Patent: Aug. 23, 2016

(54) DETECTION APPARATUS COMPRISING TWO SCINTILLATORS FOR DETECTING X-RAY RADIATION

(71) Applicant: KONINKLIJKE PHILIPS N.V., Eindhoven (NL)

(72) Inventors: Ewald Roessl, Henstedt-Ulzburg (DE); Axel Thran, Hamburg (DE); Roland Proksa, Neu Wulmstorf (DE)

(73) Assignee: KONINKLIJKE PHILIPS N.V., Eindhoven (NL)

( * ) Notice: Subject to any disclaimer, the term of this patent is extended or adjusted under 35 U.S.C. 154(b) by 0 days.

(21) Appl. No.: 14/359,311

(22) PCT Filed: Nov. 23, 2012

(86) PCT No.: PCT/IB2012/056663
§ 371 (c)(1),
(2) Date: May 20, 2014

(87) PCT Pub. No.: WO2013/080104
PCT Pub. Date: Jun. 6, 2013

(65) Prior Publication Data
US 2014/0306116 A1    Oct. 16, 2014

Related U.S. Application Data

(60) Provisional application No. 61/566,185, filed on Dec. 2, 2011.

(51) Int. Cl.
*G01T 1/20*    (2006.01)

(52) U.S. Cl.
CPC ............... *G01T 1/20* (2013.01); *G01T 1/2008* (2013.01)

(58) Field of Classification Search
CPC .......... G01T 1/202; G01T 1/20; G01T 1/2002
USPC .............................................. 250/362
See application file for complete search history.

(56) References Cited

U.S. PATENT DOCUMENTS 4,933,562 A     6/1990   Roziere
6,297,506 B1 *  10/2001  Young et al. ............... 250/369
(Continued)

FOREIGN PATENT DOCUMENTS

JP          05087935 A      4/1993

OTHER PUBLICATIONS

Alvarez, R. E., et al.; Energy-selective Reconstructions in X-ray Computerized Tomography; 1976; Phys. Med. Biol.; 21(5)733-744.
(Continued)

*Primary Examiner* — Marcus Taningco

(57) ABSTRACT

Detection apparatus for detecting radiation The invention relates to a detection apparatus for detecting radiation. The detection apparatus comprises at least two scintillators (14, 15) having different temporal behaviors, each generating scintillation light upon reception of radiation, wherein the generated scintillation light is commonly detected by a scintillation light detection unit (16), thereby generating a common light detection signal. A detection values determining unit determines first detection values by applying a first determination process and second detection values by applying a second determination process, which is different to the first determination process, on the detection signal. The first determination process includes frequency filtering the detection signal. Since the scintillation light of the different scintillators is collectively detected by the same scintillation light detection unit, detection arrangements with, for example, side-looking photodiodes for separately detecting the different scintillation light of the different scintillators are not necessarily required, thereby reducing the technical complexity of the detection apparatus.

20 Claims, 3 Drawing Sheets

(56) References Cited

U.S. PATENT DOCUMENTS

| | | | |
|---|---|---|---|
| 7,492,871 B2 * | 2/2009 | Popescu et al. | 378/145 |
| 2005/0269515 A1 | 12/2005 | Saleh et al. | |
| 2006/0067472 A1 | 3/2006 | Possin et al. | |
| 2007/0051892 A1 * | 3/2007 | Warburton et al. | 250/362 |
| 2007/0158573 A1 | 7/2007 | Deych | |
| 2009/0039271 A1 | 2/2009 | Farsoni et al. | |
| 2011/0096892 A1 * | 4/2011 | Forthmann et al. | 378/5 |

OTHER PUBLICATIONS

Kappler, S., et al.; Comparison of dual-kVp and dual-layer CT in simulations and real CT system measurements; 2008; IEEE Trans. on Nuclear Science; pp. 19-25.

Mozer, F. S., et al.; Development of a Double Layered Scintillator for Separating and Detecting Low Energy Protons and Electrons; 1968; IEEE Trans. on Nuclear Science; 15(3)144-146.

* cited by examiner

DETECTION APPARATUS COMPRISING TWO SCINTILLATORS FOR DETECTING X-RAY RADIATION

CROSS REFERENCE TO RELATED APPLICATIONS

This application is a national filing of PCT application Serial No. PCT/IB2012/056663, filed Nov. 23, 2012, published as WO 2013/080104 A2 on Jun. 6, 2013, which claims the benefit of U.S. provisional application Ser. No. 61/566,185 filed Dec. 2, 2011, which is incorporated herein by reference.

FIELD OF THE INVENTION

The invention relates to a detection apparatus, a detection method and a detection computer program for detecting radiation. The invention relates further to an imaging system, an imaging method and an imaging computer program for imaging an object.

BACKGROUND OF THE INVENTION

The article "Comparison of dual-kVp and dual-layer CT in simulations and real CT system measurements" by S. Kappler et al., IEEE Nuclear Science Symposium Conference Record (NSS/MIC), pages 4828 to 4831 (2008) discloses a dual-energy computed tomography system comprising a polychromatic x-ray source and a dual-layer detector. The computed tomography system is adapted to generate x-rays, which traverse an object to be imaged, while the x-ray source is rotated with respect to the object. The radiation, after having traversed the object, is detected by the dual-layer detector, wherein in a first layer, which is firstly hit by the radiation, a first scintillator generates first scintillation light depending on the detected radiation and wherein in a second layer, which is secondly hit by the radiation, a second scintillator generates second scintillation light depending on the radiation. The first scintillation light and the second scintillation light, which correspond to different energies of the detected radiation, are detected by photodiodes, wherein the photodiode for detecting the first scintillation light is arranged adjacent to a side surface of the first scintillator, i.e. not, for example, on a bottom surface of the first scintillator. This arrangement on the side surface leads to a technically relatively complex detector construction.

SUMMARY OF THE INVENTION

It is an object of the present invention to provide a detection apparatus, a detection method and a detection computer program for detecting radiation, which allow detecting the radiation by using a technically less complex detector construction. It is a further object of the present invention to provide an imaging system, an imaging method and an imaging computer program for imaging an object, which can use the technically less complex detector construction.

In a first aspect of the present invention a detection apparatus for detecting radiation is presented, wherein the detection apparatus comprises:
  a radiation receiving unit including:
    a first scintillator for generating first scintillation light depending on the radiation, wherein the first scintillation light has a first temporal behavior,
    a second scintillator for generating second scintillation light depending on the radiation, wherein the second scintillation light has a second temporal behavior being different to the first temporal behavior,
  a scintillation light detection unit for detecting the first scintillation light and the second scintillation light and for generating a common light detection signal being indicative of the first scintillation light and the second scintillation light,
  a detection values determining unit for determining a first detection value and a second detection value, wherein the detection values determining unit is adapted to:
    determine the first detection value by applying a first determination process on the common light detection signal, wherein the first determination process includes frequency filtering the common light detection signal by using a first frequency filter, thereby generating a first filtered common light detection signal, and determining the first detection value depending on the first filtered common light detection signal,
    determine the second detection value by applying a second determination process on the common light detection signal, wherein the second determination process is different to the first determination process.

Since the scintillation light detection unit, which is preferentially a photodiode, detects the first scintillation light and the second scintillation light and generates a common light detection signal being indicative of the first scintillation light and the second scintillation light, wherein the detection values determining unit determines first and second detection values by applying different determination processes on the common light detection signal, wherein at least one of the determination processes includes a frequency filtering, the first scintillation light and the second scintillation light can collectively be detected by the same scintillation light detection unit, without requiring different scintillation light detection units arranged at side surfaces of the scintillators for separately detecting the first scintillation light and the second scintillation light, wherein still spectrally different detection signals can be generated, which can be used, for instance, for energy discrimination purposes. Since the first scintillation light and the second scintillation light can be detected by the same scintillation light detection unit, the first scintillator and the second scintillator can be stacked, for example, on top of each other, wherein the resulting stack can be arranged on the scintillation light detection unit. The radiation can therefore be detected with a technically less complex detector construction.

The scintillation light detection unit is preferentially adapted to detect the combined intensity of the first scintillation light and the second scintillation light and to generate a common light detection signal being indicative of the detected combined intensity.

The first and second determination processes are preferentially adapted such that the application of the first determination process on the common detection signal leads to a first signal being spectrally different to a second signal being generated by applying the second determination process on the common light detection signal. The first and second detection values are preferentially determined based on these spectrally different first and second signals.

In a scintillator interacting photons populate electrons in an excited state of a given lifetime. Scintillation light is generated, if the electrons relax into a ground state. This relaxation process has a decay time constant being the decay time constant, to which the respective scintillation light corresponds. A single transition to the ground state, which corresponds to a single decay time constant, or several transitions to the ground state, which corresponds to several decay time constants, can be possible. Correspondingly, the temporal behavior of scintillation light can therefore be defined by one or several decay time constants.

The first and second determination processes depend preferentially on the first and second temporal behaviors. In particular, the first and second determination processes can include first and second frequency filtering procedures, which are adapted to the first and second temporal behaviors.

For instance, the first frequency filter can be a high-pass filter for suppressing relatively low frequencies, which may correspond to one or several decay time constants of the slower one of the first and second scintillation light, i.e. of the scintillation light having the larger one or several decay time constants. This allows generating a first filtered common light detection signal having a larger contribution from the faster scintillation light, i.e. a larger contribution of the scintillation light having a faster temporal behavior, in particular, a smaller decay time constant. In addition, also higher frequencies can be suppressed such that the first frequency filter is a band-pass filter. This can reduce noise in the first filtered common light detection signal. Preferentially, the band-pass filter suppresses frequencies, which correspond to the slower scintillation light having a slower temporal behavior, in particular, having a larger decay time constant, and to suppress frequencies being larger than frequencies, which correspond to the faster scintillation light, i.e. which correspond to the faster temporal behavior, in particular, to the smaller time constant of the faster scintillation light.

In an embodiment, a high-pass filter is used suppressing frequencies being smaller than a mean value of the inverse value of the decay time constants of the first and second scintillation light. In particular, the high-pass filter can be adapted to suppress frequencies being smaller than the geometric mean of the inverse value of a first decay time constant of the first scintillation light and the inverse value of a second decay time constant of the second scintillation light. The band-pass filter can be adapted to also suppress frequencies being smaller than a mean value of the inverse value of the first decay time constant and the inverse value of the second decay time constant, and the band-pass filter can be adapted to suppress frequencies being larger than ten times the inverse second decay time constant, wherein it is assumed that the second decay time constant is smaller than the first decay time constant.

In an embodiment, the first determination process includes a) squaring or rectifying the first frequency filtered common light detection signal, b) integrating the squared or rectified first frequency filtered common light detection signal, thereby generating a first integrated value, and c) determining the first detection value depending on the first integrated value. This allows determining a first detection value in a relatively simple way such that it is likely that the faster scintillation light contributes more to the first detection value than the slower scintillation light.

The second determination process preferentially includes a) frequency filtering the common light detection signal by using a second frequency filter, thereby generating a second filtered common light detection signal, and b) determining the second detection value depending on the second filtered common light detection signal. The second frequency filter is preferentially a low-pass filter, and the second determination process preferentially further includes integrating the second filtered common light detection signal, thereby generating a second integrated value, wherein the second detection value is determined depending on the second integrated value. The low-pass filter is preferentially adapted to suppress frequencies being larger than a mean value of the inverse value of a first decay time constant of the first scintillation light and the inverse value of a second decay time constant of the second scintillation light. The mean value is preferentially a geometric mean value. This allows determining a second detection value comprising an increased contribution of the slower scintillation light, i.e. comprising a contribution of the slower scintillation light to the second detection value being larger than the contribution of the slower scintillation light to the first detection value, in a relatively simple way.

In another embodiment, the second determination process includes integrating the common light detection signal, thereby generating a second integrated value, and determining the second detection value depending on the second integrated value, without applying a second frequency filter. This reduces computational costs for determining the second detection value.

In an embodiment, the decay time constant of the faster scintillation light is about 50 ns an d the decay time constant of the slower scintillation light is about 3 µs.

The detection apparatus is preferentially adapted to be used by a computed tomography system, wherein the computed tomography system comprises a radiation source and the detection apparatus. The radiation source and the detection apparatus are rotatable with respect to an object to be imaged, in order to allow the computed tomography apparatus to acquire the first and second detection values at different positions of the radiation source relative to the object. The integration is preferentially performed over a temporal interval, which corresponds to the temporal interval during which the radiation source is in a certain angular interval which corresponds to a projection. Thus, the integration is preferentially performed over a projection time, which is defined by the time interval, during which the radiation source is in a certain angular interval, in order to determine for the respective projection first and second detection values. The projection time and, thus, the integration time can be in the range of 50 to 500 µs.

In an embodiment, the first determination process is adapted to frequency filter the common light detection signal such that the first filtered common light detection signal is an alternating level of the common light detection signal, whereas the second determination process is adapted such that the application of the second determination process on the common light detection signal yields the constant level of the common light detection signal. The first determination process can be adapted to square or rectify the alternating level, which can also be regarded as being the AC level of the common light detection signal, and to integrate the squared or rectified alternating level for determining the first detection value. Moreover, the second determination process can be adapted to integrate the constant level, which may also be regarded as being a DC level of the common light detection signal, for determining the second detection value.

Preferentially, the first scintillator, the second scintillator and the scintillation light detection unit are optically coupled such that both, the first scintillation light and the second scintillation light, can be collectively detected by the scintillation light detection unit. In particular, the first scintillator, the second scintillator and the scintillation light detection unit form a stack such that one of the first scintillator and the second scintillator is located on the scintillation light detection unit and the other of the first scintillator and the second scintillator is located on the one of the first scintillator and the second scintillator. The stack is preferentially arranged such that the radiation to be detected firstly traverses the one of the first scintillator and the second scintillator and then enters the other of first scintillator and the second scintillator. Low-energy radiation will mainly be absorbed in the scintillator, which is firstly traversed, such that the corresponding scintillation light is indicative of the low-energy radiation. The further scintillator, which is traversed secondly, is more traversed by high-energy radiation than by low-energy radiation, because a large amount of the low-energy radiation has been absorbed by the scintillator, which has been traversed firstly. The corresponding scintillation light is therefore indicative of the high-energy radiation. The first and second detection values, to which the first scintillation light and the second scintillation light contribute differently, can therefore correspond to different energies. The first and second detection values can therefore be used for obtaining information about the energy of the radiation detected by the detection apparatus.

Preferentially, the temporal behavior of the first scintillator is characterizable by a first decay time constant and the temporal behavior of the second scintillator is characterizable by a second decay time constant being smaller than the first decay time constant, wherein the first scintillator, the second scintillator and the scintillation light detection unit form a stack such that the second scintillator is located on the scintillation light detection unit and the first scintillator is located on the second scintillator. Since the upper first scintillator mainly detects low energy radiation, which yields a plurality of relatively small first scintillation light pulses, the resulting first scintillation light corresponds to a relatively smooth light detection signal. Moreover, since the lower second scintillator detects more high energy radiation, the lower second scintillator generates second scintillation light, which is more fluctuating than the first scintillation light. This effect of a relatively smooth first scintillation light and a relatively fluctuating second scintillation light enhances the effect caused by the different decay time constants, because also the different decay time constants result in first scintillation light being smoother than the more fluctuating second scintillation light.

The first scintillator, the second scintillator and the scintillation light detection unit can be optically coupled by using optical coupling material. The optical coupling material is preferentially optically transparent glue, wherein the glue is at least transparent to the first scintillation light and the second scintillation light.

In a further aspect of the present invention an imaging system for imaging an object is presented, wherein the imaging system comprises:
 a detection apparatus for detecting radiation, which is influenced by the object, as defined in claim 1,
 a reconstructing unit for reconstructing an image of the object from the first and second detection values.

The imaging system preferentially further comprises a radiation source for generating the radiation, wherein the imaging system is adapted to provide the radiation such that it traverses the object before being detected by the detection apparatus. The radiation source is preferentially a polychromatic x-ray source for generating polychromatic x-rays, wherein the detection apparatus can be adapted to detect the polychromatic x-rays, after they have traversed the object, and to generate the first and second detection values depending on the detected polychromatic x-rays.

The reconstruction unit can be adapted to decompose the first and second detection values into component detection values, which correspond to different components being, for example, different physical effects and/or different materials. For instance, the different components can correspond to the Compton effect and the photoelectric effect, or the different components can correspond to soft tissue and bone. The reconstruction unit can be adapted to reconstruct component images, which correspond to the different components, by applying a computed tomography algorithm to the respective component detection values. In another embodiment, before decomposing the detection values into component detection values, the reconstruction unit can transform the first and second detection values into first and second intermediate detection values, which correspond to the intensities of the first and second scintillation light, respectively. Thus, a transformation for quantifying the intensities of the first and second scintillation light can be provided and applied to the first and second detection values. This transformation can be determined by calibration measurements and is preferentially a linear transformation. The reconstruction unit can then be adapted to perform the decomposition procedure for generating the component detection values based on the generated intermediate detection values.

In an embodiment, the transformation for transforming the first and second detection values into detection values, which correspond to the intensities of the first and second scintillation light, can also be performed, without a following reconstruction based on these detection values. In this case the transformation can be performed, for instance, by the detection values determining unit and the detection apparatus can be adapted to provide these detection values.

In an embodiment, the radiation source and the first and second scintillators of the detection apparatus are adapted such that the intensities of the first scintillator light and of the second scintillation light are similar or differ by a factor being smaller than ten. This can be achieved, for example, by choosing the scintillator materials, their doping, their thickness, et cetera accordingly. This can ensure that both scintillators significantly contribute to both detection values and that, for instance, a detection value is not dominated by a single scintillafor only and that the contribution of the other scintillator is not below the noise level, thereby increasing the quality of the first and second detection values.

In a further aspect of the present invention a detection method for detecting radiation is presented, wherein the detection method comprises:
 generating first scintillation light depending on the radiation by a first scintillator, wherein the first scintillation light has a first temporal behavior,
 generating second scintillation light depending on the radiation by a second scintillator, wherein the second scintillation light has a second temporal behavior being different to the first temporal behavior,
 detecting the first scintillation light and the second scintillation light and generating a common light detection signal being indicative of the first scintillation light and the second scintillation light by a scintillation light detection unit,
 determining a first detection value and a second detection value by a detection values determining unit, wherein the detection values determining unit:
 determines the first detection value by applying a first determination process on the common light detection signal, wherein the first determination process includes frequency filtering the common light detection signal by using a first frequency filter, thereby generating a first filtered common light detection signal, and determining the first detection value depending on the first filtered common light detection signal,
 determines the second detection value by applying a second determination process on the common light detection signal, wherein the second determination process is different to the first determination process.

In a further aspect of the present invention an imaging method for imaging an object is presented, wherein the imaging method comprises:

detecting radiation, which is influenced by the object, as defined in claim 12, reconstructing an image of the object from the first and second detection values by a reconstructing unit.

In a further aspect of the present invention a detection computer program for detecting radiation is presented, wherein the detection computer program comprises program code means for causing a detection apparatus as defined in claim 1 to carry out the steps of the detection method as defined in claim 12, when the computer program is run on a computer controlling the detection apparatus.

In a further aspect of the present invention an imaging computer program for imaging an object is presented, wherein the imaging computer program comprises program code means for causing an imaging system as defined in claim 11 to carry out the steps of the imaging method as defined in claim 13, when the computer program is run on a computer controlling the imaging system.

It shall be understood that the detection apparatus of claim 1, the imaging system of claim 10, the detection method of claim 12, the imaging method of claim 13, the detection computer program of claim 14 and the imaging computer program of claim 15 have similar and/or identical preferred embodiments, in particular, as defined in the dependent claims.

It shall be understood that a preferred embodiment of the invention can also be any combination of the dependent claims with the respective independent claim.

These and other aspects of the invention will be apparent from and elucidated with reference to the embodiments described hereinafter.

DETAILED DESCRIPTION OF EMBODIMENTS

Figure 1:
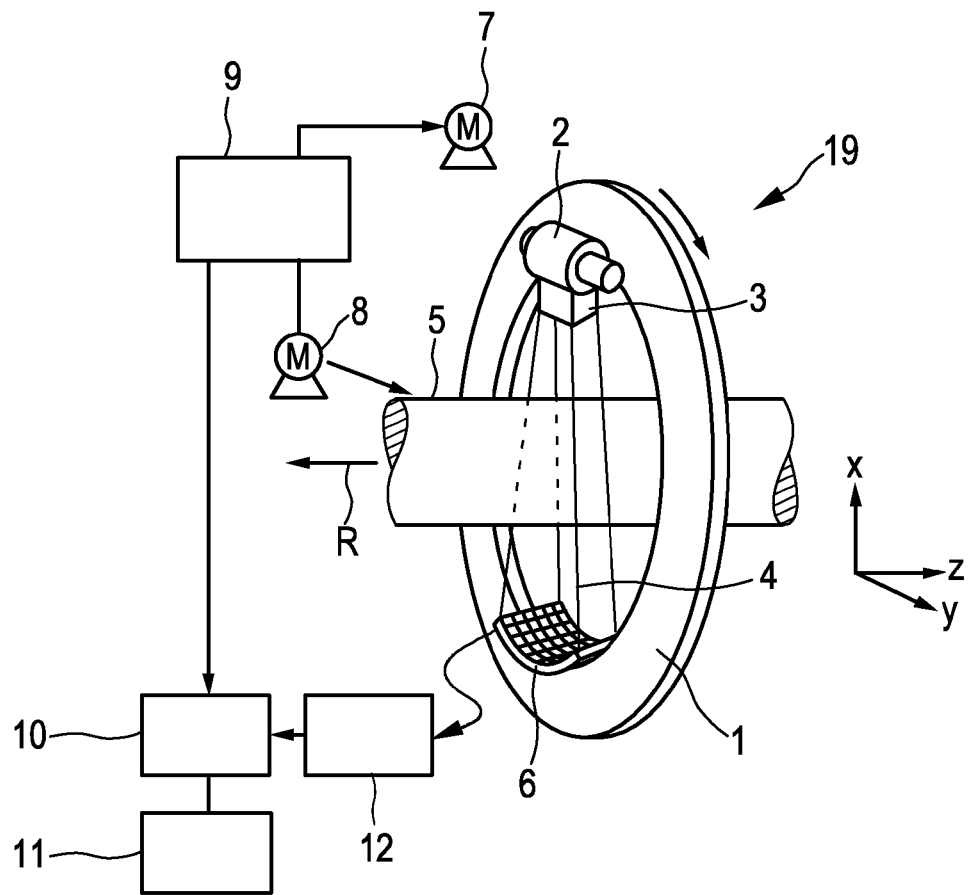
FIG. 1 shows schematically and exemplarily an embodiment of an imaging system for imaging an object.

FIG. 1 shows schematically and exemplarily an imaging system for imaging a region of interest being a computed tomography system 19. The computed tomography system includes a gantry 1 which is capable of rotation about a rotational axis R which extends parallel to the z direction. A radiation source 2, which is, in this embodiment, an x-ray tube, is mounted on the gantry 1. The radiation source 2, which generates polychromatic radiation, is provided with a collimator 3, which forms, in this embodiment, a conical radiation beam 4 from the radiation generated by the radiation source 2. The radiation traverses an object such as a patient in an examination zone 5, which is, in this embodiment, cylindrical. After having traversed the examination zone 5, the radiation beam 4 is incident on a radiation receiving unit 6, which comprises a two-dimensional detection surface. The radiation receiving unit 6 is mounted on the gantry 1.

The computed tomography system 19 comprises two motors 7, 8. The gantry 1 is driven at a preferably constant but adjustable angular speed by the motor 7. The motor 8 is provided for displacing the object, for example, a patient, who is arranged on a patient table in the examination zone 5, parallel to the direction of the rotational axis R or the z axis. These motors 7, 8 are controlled by a control unit 9, for instance, such that the radiation source 2 and the examination zone 5, in particular, the object within the examination zone 5, are moved relative to each other along a helical trajectory. However, it is also possible that the object is not moved, but that only the radiation source 2 is rotated, i.e. that the radiation source 2 moves along a circular trajectory relative to the examination zone 5, in particular, relative to the object. Furthermore, in another embodiment, the collimator 3 can be adapted for forming another beam shape, in particular, a fan beam, and the radiation receiving unit 6 can comprise a detection surface, which is shaped corresponding to the other beam shape, in particular, corresponding to the fan beam.

Figure 2:
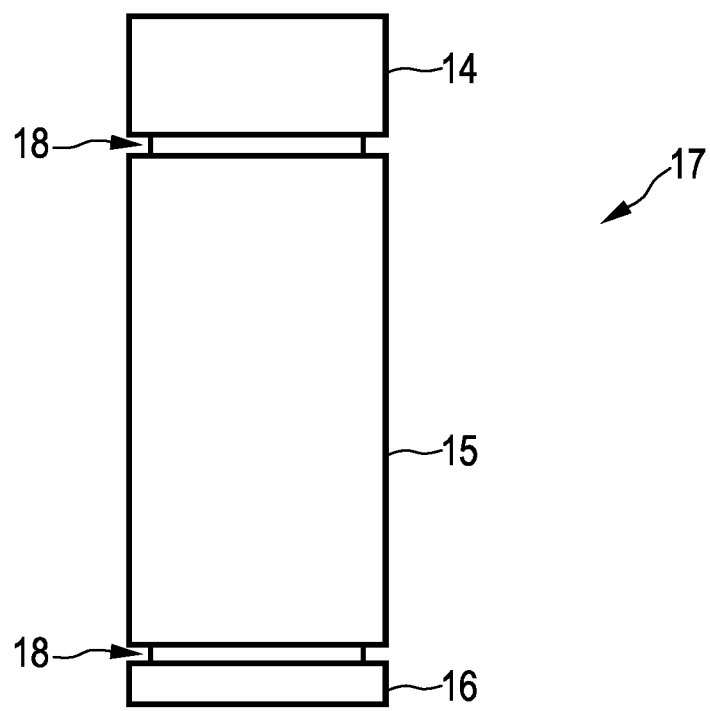
FIG. 2 shows schematically and exemplarily an embodiment of a radiation receiving pixel of a radiation receiving unit of the imaging system.

The radiation receiving unit 6 comprises several radiation receiving pixels 17 of which one is schematically and exemplarily shown in FIG. 2. The radiation receiving pixel 17 comprises a first scintillator 14 for generating first scintillation light depending on the detected radiation and a second scintillator 15 for generating second scintillation light depending on the detected radiation, wherein the first scintillation light corresponds to a first decay time being larger than a second decay time to which the second scintillation light corresponds, i.e. the first scintillation light and the second scintillator light have different temporal behaviors characterized by different decay time constants. The radiation receiving pixel 17 further comprises a scintillation light detection unit 16 for detecting the first scintillation light and the second scintillation light and for generating a common light detection signal being indicative of the first scintillation light and the second scintillation light. The first scintillator 14, the second scintillator 15 and the scintillation light detection unit 16 are optically coupled such that both, the first scintillation light and the second scintillation light, can be collectively detected by the scintillation light detection unit 16. The scintillation light detection unit 16 is preferentially a photodiode being adapted for detecting the first scintillation light and the second scintillation light. The photodiode is sufficiently fast for temporally resolving the pulses of the relatively short second scintillator light.

The first scintillator 14, the second scintillator 15 and the second light detection unit 16 form a stack such that the second scintillator 15 is located on the scintillation light detection unit 16 and the first scintillator 14 is located on the second scintillator 15, wherein the first scintillator 14, the second scintillator 15 and the scintillation light detection unit 16 are optically coupled by using optical coupling material 18 being, in this embodiment, optically transparent glue which is transparent to the first scintillation light and the second scintillation light.

The first and second scintillators 14, 15 are adapted such that the intensities of the first scintillation light and of the second scintillation light are similar or differ by a factor being smaller than ten. In particular, the scintillation materials, their doping and their thicknesses are adapted such that this similarity condition regarding the intensities of the first scintillation light and of the second scintillation light is fulfilled, in particular, within a typical energy range of x-rays of, for instance, 40 to 140 keV.

During a relative movement of the radiation source 2 and the object within the examination zone 5, the radiation receiving unit 6 collectively detects the first scintillation light and the second scintillation light and generates a common light detection signal being indicative of the first scintillation light and the second scintillation light.

The generated common light detection signal is provided to a detection values determining unit 12 for determining a first detection value and a second detection value. The detection values determining unit 12 is adapted to determine the first detection value by applying a first determination process on the common light detection signal, wherein the first determination process includes frequency filtering the common light detection signal by using a first frequency filter, thereby generating a first filtered common light detection signal, and determining the first detection value depending on the first filtered common light detection signal. The detection values determining unit is further adapted to determine the second detection value by applying a second determination process on the common light detection signal, wherein the second determination process is different to the first determination process. In this embodiment, the first frequency filter is a high-pass filter or a band-pass filter, and the first determination process includes a) squaring or rectifying the first frequency filtered common light detection signal, b) integrating the squared or rectified first frequency filtered common light detection signal, thereby generating a first integrated value, and c) determining the first detection value depending on the first integrated value. The second determination process includes a) frequency filtering the common light detection signal by using a second frequency filter, thereby generating a second filtered common light detection signal, and b) determining the second detection value depending on the second filtered common light detection signal, wherein the second frequency filter is a low-pass filter.

Preferentially, a high-pass filter is used suppressing frequencies being smaller than a mean value of the inverse value of the decay time constants of the first and second scintillation light. In particular, the high-pass filter can be adapted to suppress frequencies being smaller than the geometric mean of the inverse value of a first decay time constant of the first scintillation light and the inverse value of a second decay time constant of the second scintillation light. The band-pass filter can be adapted to also suppress frequencies being smaller than a mean value of the inverse value of the first decay time constant and the inverse value of the second decay time constant, and the band-pass filter can be adapted to suppress frequencies being larger than ten times the inverse second decay time constant, wherein it is assumed that the second decay time constant is smaller than the first decay time constant. The low-pass filter is preferentially adapted to suppress frequencies being larger than a mean value of the inverse value of a first decay time constant of the first scintillation light and the inverse value of a second decay time constant of the second scintillation light. The mean value is preferentially a geometric mean value.

Preferentially for each position of the radiation source 2 relative to the object within the examination zone 5 and for each radiation receiving pixel 17 the detection values determining unit determines a first detection value and a second detection value, respectively.

The first and second detection values, which have been determined for each position of the radiation source 2 relative to the object within the examination zone 5 and for each radiation receiving pixel 17 are provided to a reconstruction unit 10 for reconstructing an image of the object based on the first and second detection values. The image reconstructed by the reconstruction unit 10 is provided to a display unit 11 for displaying the reconstructed image.

The control unit 9 is preferentially also adapted to control the radiation source 2, the radiation receiving unit 6, the detection values determining unit 12 and the reconstruction unit 10. Since the radiation receiving unit 6 and the detection values determining unit 12 generate the first and second detection values based on the radiation incident on the detection surface of the radiation receiving unit, the radiation receiving unit and the detection values determining unit can be regarded as being a detection apparatus for detecting radiation.

The reconstruction unit 10 is preferentially adapted to decompose the first and second detection values into different component detection values, which correspond to different components of the object. These different components are, for example, related to different physical effects like the Compton effect and the photoelectric effect and/or the different components can be related to different materials like bone, soft tissue, et cetera of a human being. In this embodiment, the first and second detection values are transformed to intermediate detection values, which correspond to the intensities of the first and second scintillation light. The transformation is preferentially a linear transformation, which can be determined by calibration measurements. For instance, radiation producing known scintillation light intensities can be detected by the detection apparatus, wherein the transformation can be determined based on the known scintillation light intensities and the first and second detection values generated by the detection apparatus. The reconstruction unit 10 can be adapted to apply the decomposition technique disclosed in the article "Energy-selective reconstructions in X-ray computerized tomography" by R. E. Alvarez et al., Physics in Medicine and Biology, volume 21, number 5, pages 733 to 744 (1976), which is herewith incorporated by reference, to the intermediate detection values.

In an embodiment, the decomposition of the intermediate detection values is performed in accordance with the following equation, which is based on the inversion of a physical model describing the measurement process:

$$C_i = \int B_i(E) F(E) e^{-\sum_j^M A_j \mu_j(E)} dE \quad (1)$$

wherein $C_i$ with i=1, 2 denotes first and second intermediate detection values, $B_i(E)$ denotes the spectral sensitivity of an i-th measurement which corresponds to the first or second intermediate detection value, respectively, $F(E)$ denotes the spectrum of the radiation source, j=1 . . . M with typically M=2 is an index for the M different components, $A_j$ denotes a line integral of concentration values through the j-th component and $\mu_j(E)$ denotes the spectral absorption coefficient of the j-th component.

If the number of spectrally distinct measurements is at least equal to the number of components, the system of equations can be solved with known numerical methods, wherein the quantities $B_i(E)$, $F(E)$ and $\mu_j(E)$ are known and the results of solving the system of equations are the line integrals $A_j$. The spectrum of radiation $F(E)$ and the spectral sensitivity $B_i(E)$ are characteristics of the imaging system and the nature of the readout and are known from, for example, corresponding measurements. The spectral absorption $\mu_j(E)$ of the components, for example, the spectral absorption of bone and soft tissue, is also known from measurements and/or from literature.

The decomposed detection values are, in this embodiment, decomposed projection data, i.e. the line integrals $A_j$, which can each be used for reconstructing a computed tomography image of the object such that, for instance, for each component a component image of the object can be reconstructed. For instance, a Compton component image and a photoelectric component image can be reconstructed. For reconstructing an image based on the projection data known reconstruction techniques can be used like filtered back projection, Radon inversion, et cetera.

In another embodiment, the reconstruction unit can be adapted to directly decompose the first and second detection values, without performing the transformation for determining the intermediate detection values. In this case, the decomposition can be performed in accordance with the following equation:

$$N_k = \sum_{l=1}^{2} \int P_{kl}(E) S_l(E) F(E) e^{-\sum_{j=1}^{M} A_j \mu_j(E)} dE \quad (2)$$

wherein $N_k$ with k=1, 2 denotes the first or second detection value, respectively, $S_l(E)$ denotes the spectral sensitivity of the l-th scintillator and $P_{kl}(E)$ can be defined by following equations:

$$P_{11} = E^2 c_{11}, P_{12} = E^2 c_{12} \text{ and} \quad (3)$$

$$P_{21} = E c_{21}, P_{22} = E c_{22}. \quad (4)$$

The different temporal behaviors of the first and second scintillators influence the coefficients $c_{kl}$. These coefficients can be determined by calibration measurements, by simulation or analytically.

Since the quantities $P_{kl}(E)$, $S_l(E)$, $F(E)$ and $\mu_j(E)$ are known, the system of equations can be solved with known numerical methods, if the number of spectrally distinct measurements is at least equal to the number of components. The results of solving the system of equations are the line integrals $A_j$, which can be used for reconstructing a computed tomography image for each component of the object as described above.

Figure 3:
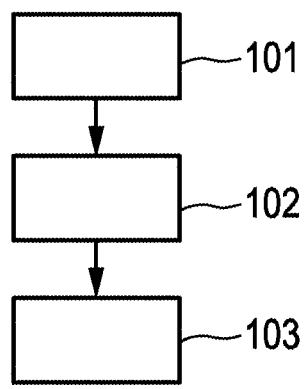
FIG. 3 shows a flowchart exemplarily illustrating an embodiment of an imaging method for imaging an object.

In the following an embodiment of an imaging method for imaging an object will exemplarily be described with reference to a flowchart shown in FIG. 3.

In step 101, the radiation source 2 generates photons having different energies, while the radiation source 2 and the object are moved relative to each other, in order to allow the radiation to traverse the object in different directions. In particular, the radiation source 2 is moved along a circular or helical trajectory around the object, while the first scintillator generates first scintillation light depending on the radiation and the second scintillator generates second scintillation light depending on the radiation. The first scintillation light and the second scintillation light are detected and a common light detection signal being indicative of the first scintillation light and the second scintillation light is generated by the scintillation light detection unit. Moreover, a first detection value is determined by applying a first determination process on the common light detection signal, wherein the first determination process includes frequency filtering the common light detection signal by using a first frequency filter, thereby generating a first filtered common light detection signal, and determining the first detection value depending on the first filtered common light detection signal. A second detection value is determined by applying a second determination process on the common light detection signal, wherein the second determination process is different to the first determination process.

In step 102, the first and second detection values, which have been determined for each spatial position of the radiation source relative to the object and for each radiation receiving pixel, are provided to the reconstruction unit, and an image of the object is reconstructed based on the first and second detection values by using, for example, a computed tomography reconstruction algorithm like a filtered back projection algorithm. In step 103, the reconstructed image is shown on the display unit.

The generation of the first and second scintillation light, the detection of the first scintillation light and the second scintillation light, the generation of the common light detection signal and the determination of the first detection value and the second detection value based on the common light detection signal performed in step 101 can be regarded as being steps of a detection method for detecting radiation.

The above described detection apparatus is a dual-layer detector system that operates with a single conventional photodiode and that can be adapted to allow separating the signals coming from front- and back-scintillators.

The first scintillator is a relatively slow scintillator having a first decay time of, for instance, about 3 µs and the second scintillator is a relatively fast scintillator having a decay time of, for instance, about 50 ns or smaller. The first scintillator is, for instance, a gadolinium oxysulfide (GOS) scintillator and the second scintillator is, for instance, a garnet scintillator. The first scintillator and the second scintillator can be regarded as forming top and bottom scintillator layers, which are optically coupled, wherein the optical signals generated by the top and bottom scintillator layers can be collectively read out by the scintillation light detection unit being preferentially a fast photodiode. The decay time constant of the slow scintillator can be in the range of 200 ns to 3 µs and the decay time constant of the fast scintillator can be in the range of 5 to 100 ns.

The detection apparatus described above with reference to FIGS. 1 and 2 overcomes the problem of the required optical decoupling of the front and back scintillators and the need for side-looking photodiodes. Both aspects could reduce detector costs by significantly simplifying the detector manufacturing process.

The photocurrent in the photodiode is preferentially driven by short pulses from the fast scintillator and by longer pulses from the slower scintillator. The detection apparatus is preferentially adapted such that the power in the two signal contributions is located in sufficiently disjoint frequency regimes such that different band-pass filters adapted to the decay time constants allow the quantification of the amount of scintillation light originating from the two detector layers. The detection values determining unit is preferentially adapted to realize the signal separation by filters, in particular, in the temporal frequency domain, that select the fast or slow components in the signal, i.e. in the common light detection signal, after duplication and hence allow the quantification of the total power of light output from the top and bottom layers separately, despite the detection in a single photodiode. The scintillation light detection unit preferentially further comprises integrators for integrating the low-pass filtered signal and the high-pass filtered signal, respectively.

The scintillation light detection unit, in particular, the photodiode, has to resolve the fluctuation of both scintillators and, thus, has to be sufficiently fast. The photodiode is, for example, a silicon-PIN photodiode. The photodiode is preferentially adapted to be operated at a bandwidth of up to, for example, 1 GHz.

In an embodiment, the first determination process is adapted to frequency filter the common light detection signal such that the first filtered common light detection signal is an alternating level of the common light detection signal, whereas the second determination process is adapted such that the application of the second determination process on the common light detection signal yields the constant level of the common light detection signal. The first determination process can be adapted to square or rectify the alternating level, which can also be regarded as being the AC level of the common light detection signal, and to integrate the squared or rectified alternating level for determining the first detection value. Moreover, the second determination process can be adapted to integrate the constant level, which may also be regarded as being a DC level of the common light detection signal, for determining the second detection value.

The detection values determining unit can be adapted to process an originally analog common light detection signal, or to digitize the common light detection signal and to process the digitized common light detection signal.

Although in the above described embodiments the detection values determining unit which comprises, for instance, low- and high-pass filters and integrators, is not arranged on the gantry 1, in other embodiments the detection values determining unit, in particular, the filters and integrators can also be located on the gantry 1 close, in particular, adjacent to the radiation receiving unit.

Although in the above described embodiments the detection apparatus has been described as being adapted for being used in a computed tomography system, in other embodiments the detection apparatus can also be adapted for being used in other imaging systems like nuclear imaging systems, for instance, single photon emission computed tomography or positron emission tomography systems imaging systems, or X-ray C-arm imaging systems.

Although in the above described embodiments the radiation receiving unit comprises two scintillators having different decay time constants, in other embodiments the radiation receiving unit can also comprise more than two scintillators having different decay time constants, wherein the detection values determining unit can be adapted to determine several detection values by applying more than two different determination processes on the common light detection signal. For instance, for each scintillator a band-pass filter can be used, which corresponds to the respective decay time constant, for filtering the common light detection signal, wherein for each scintillator a filtered signal is generated, optionally squared or rectified and preferentially integrated for generating detection values corresponding to the scintillators. The several detection values corresponding to the several scintillators can than be used for determining component detection values which correspond to more than two components. For instance, the components can correspond to more than two physical effects like the Compont effect, the photoelectric effect and an K-edge effect.

Other variations to the disclosed embodiments can be understood and effected by those skilled in the art in practicing the claimed invention, from a study of the drawings, the disclosure, and the appended claims.

In the claims, the word "comprising" does not exclude other elements or steps, and the indefinite article "a" or "an" does not exclude a plurality.

A single unit or device may fulfill the functions of several items recited in the claims. The mere fact that certain measures are recited in mutually different dependent claims does not indicate that a combination of these measures cannot be used to advantage.

Operations like the filtering operations and the integrating operations performed by one or several units or devices can be performed by any other number of units or devices. These operations and/or the control of the imaging system in accordance with the imaging method and/or the control of the detection apparatus in accordance with the detection method can be implemented as program code means of a computer program and/or as dedicated hardware.

A computer program may be stored/distributed on a suitable medium, such as an optical storage medium or a solid-state medium, supplied together with or as part of other hardware, but may also be distributed in other forms, such as via the Internet or other wired or wireless telecommunication systems.

Any reference signs in the claims should not be construed as limiting the scope.

The invention relates to a detection apparatus for detecting radiation. The detection apparatus comprises at least two scintillators having different temporal behaviors, each generating scintillation light upon reception of radiation, wherein the generated scintillation light is commonly detected by a scintillation light detection unit, thereby generating a common light detection signal. A detection values determining unit determines first detection values by applying a first determination process and second detection values by applying a second determination process, which is different to the first determination process, on the detection signal. The first determination process includes frequency filtering the detection signal. Since the scintillation light of the different scintillators is collectively detected by the same scintillation light detection unit, detection arrangements with, for example, side-looking photodiodes for separately detecting the different scintillation light of the different scintillators are not necessarily required, thereby reducing the technical complexity of the detection apparatus.

The invention claimed is:

1. A detection apparatus for detecting radiation, the detection apparatus comprising:
  a radiation receiving unit including:
    a first scintillator for generating first scintillation light depending on the radiation, wherein the first scintillation light has a first temporal behavior,
    a second scintillator for generating second scintillation light depending on the radiation, wherein the second scintillation light has a second temporal behavior being different to the first temporal behavior,
    a scintillation light detection unit for detecting the first scintillation light and the second scintillation light and for generating a common light detection signal being indicative of the first scintillation light and the second scintillation light,
  a detection values determining unit for determining a first detection value and a second detection value, wherein the detection values determining unit is adapted to:
    determine the first detection value by applying a first determination process on the common light detection signal, wherein the first determination process includes frequency filtering the common light detection signal by using a first frequency filter, thereby generating a first filtered common light detection signal, and determining the first detection value depending on the first filtered common light detection signal,
    determine the second detection value by applying a second determination process on the common light detection signal, wherein the second determination process is different to the first determination process.

2. The detection apparatus as defined in claim 1, wherein the first frequency filter is a high-pass filter.

3. The detection apparatus as defined in claim 1, wherein the first frequency filter is a band-pass filter.

4. The detection apparatus as defined in claim 1, wherein the first determination process includes:

squaring or rectifying the first frequency filtered common light detection signal, integrating the squared or rectified first frequency filtered common light detection signal, thereby generating a first integrated value, and determining the first detection value depending on the first integrated value.

5. The detection apparatus as defined in claim 1, wherein the second determination process includes:

frequency filtering the common light detection signal by using a second frequency filter, thereby generating a second filtered common light detection signal, and determining the second detection value depending on the second filtered common light detection signal.

6. The detection apparatus as defined in claim 5, wherein the second frequency filter is a low-pass filter.

7. The detection apparatus as defined in claim 5, wherein the second determination process further includes:

integrating the second filtered common light detection signal, thereby generating a second integrated value, and determining the second detection value depending on the second integrated value.

8. The detection apparatus as defined in claim 1, wherein the second determination process includes:

integrating the common light detection signal, thereby generating a second integrated value, and determining the second detection value depending on the second integrated value.

9. The detection apparatus as defined in claim 1, wherein the temporal behavior of the first scintillator is characterizable by a first decay time constant, wherein the temporal behavior of the second scintillator is characterizable by a second decay time constant being smaller than the first decay time constant, and wherein the first scintillator, the second scintillator and the scintillation light detection unit form a stack such that the second scintillator is located on the scintillation light detection unit and the first scintillator is located on the second scintillator.

10. An imaging system for imaging an object, the imaging system comprising:

a detection apparatus for detecting radiation, which is influenced by the object, as defined in claim 1, a reconstructing unit for reconstructing an image of the object from the first and second detection values.

11. The imaging system as defined in claim 10, wherein the imaging system further comprises a radiation source for generating the radiation to be detected by the detection apparatus, wherein the radiation source and the first and second scintillators of the detection apparatus are adapted such that the intensities of the first scintillation light and of the second scintillation light are similar or differ by a factor being smaller than ten.

12. A detection method for detecting radiation, the detection method comprising:

generating first scintillation light depending on the radiation by a first scintillator, wherein the first scintillation light has a first temporal behavior, generating second scintillation light depending on the radiation by a second scintillator, wherein the second scintillation light has a second temporal behavior being different to the first temporal behavior, detecting the first scintillation light and the second scintillation light and generating a common light detection signal being indicative of the first scintillation light and the second scintillation light by a scintillation light detection unit, determining a first detection value and a second detection value by a detection values determining unit, wherein the detection values determining unit:

determines the first detection value by applying a first determination process on the common light detection signal, wherein the first determination process includes frequency filtering the common light detection signal by using a first frequency filter, thereby generating a first filtered common light detection signal, and determining the first detection value depending on the first filtered common light detection signal, determines the second detection value by applying a second determination process on the common light detection signal, wherein the second determination process is different to the first determination process.

13. An imaging method for imaging an object, the imaging method comprising:

detecting radiation, which is influenced by the object, as defined in claim 12, reconstructing an image of the object from the first and second detection values by a reconstructing unit.

14. A non-transitory computer readable medium encoded with a detection computer program for detecting radiation, the detection computer program comprising program code means for causing a detection apparatus to carry out the steps of the detection method as defined in claim 12, when the detection computer program is run on a computer controlling the detection apparatus.

15. A non-transitory computer readable medium encoded with an imaging computer program for imaging an object, the imaging computer program comprising program code means for causing an imaging system to carry out the steps of the imaging method as defined in claim 13, when the imaging computer program is run on a computer controlling the imaging system.

16. A detection apparatus, comprising:

a scintillation light detection unit for detecting first scintillation light and second scintillation light and for generating a common light detection signal being indicative of the first scintillation light and the second scintillation light; and a detection values determining unit adapted to: determine a first detection value by applying a first determination process on the common light detection signal, and determine a second detection value by applying a second determination process on the common light detection signal, wherein the second determination process is different to the first determination process.

17. The detection apparatus of claim 16, wherein the first determination process includes frequency filtering the common light detection signal with a frequency filter.

18. The detection apparatus of claim 17, wherein the detection values determining unit determines the first detection value depending on the first filtered common light detection signal.

19. The detection apparatus of claim 17, wherein the frequency filter is a high-pass filter.

20. The detection apparatus of claim 17, wherein the frequency filter is a band-pass filter.

* * * * *